Oct. 23, 1928.
J. D. SARTAKOFF
1,688,832
BATH THERMOMETER
Filed Dec. 29, 1923
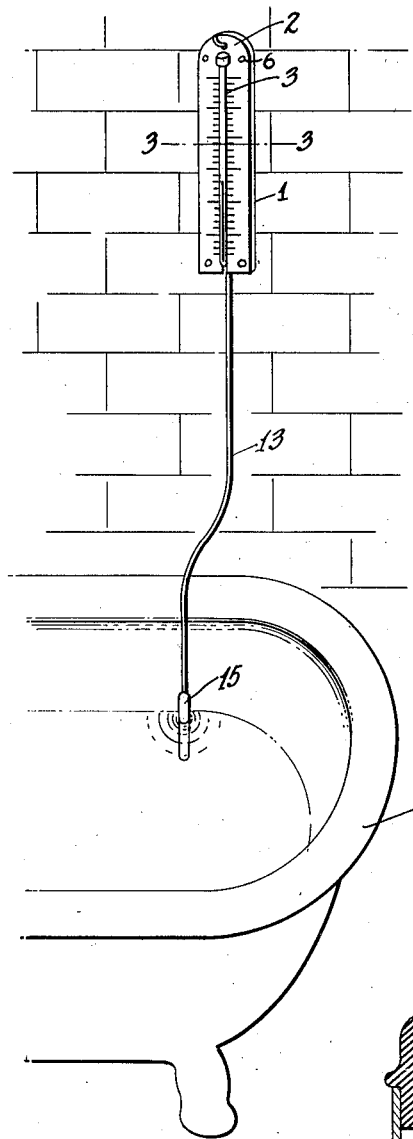
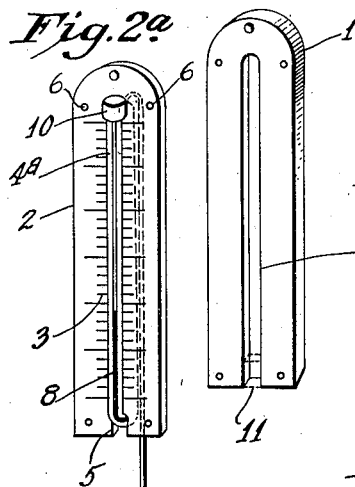
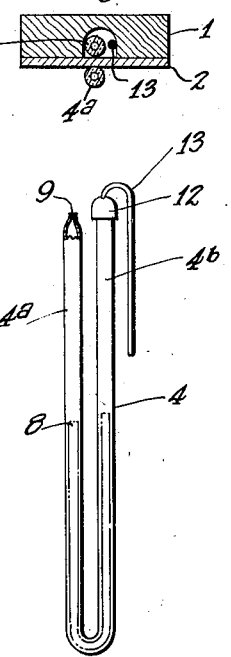
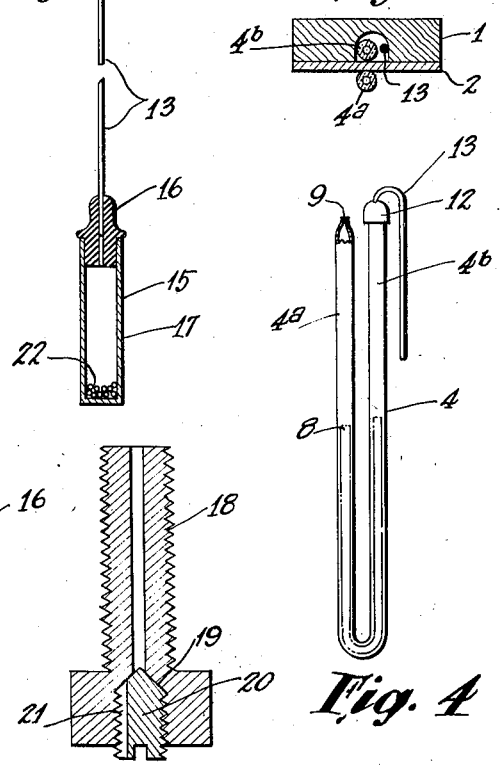
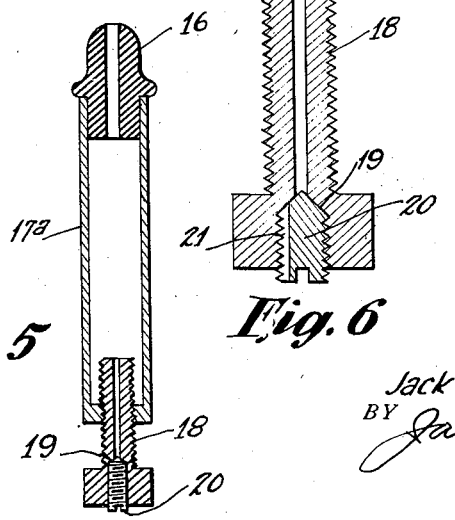
INVENTOR.
Jack D. Sartakoff
BY Jas. H. Griffin
ATTORNEYS.

Patented Oct. 23, 1928.

1,688,832

UNITED STATES PATENT OFFICE.

JACK D. SARTAKOFF, OF NEW YORK, N. Y., ASSIGNOR OF ONE-HALF TO J. D. SARTAKOFF CORPORATION, OF NEW YORK, N. Y., A CORPORATION OF NEW YORK, AND ONE-HALF TO KHETAH CORPORATION, OF NEW YORK, N. Y., A CORPORATION OF NEW YORK.

BATH THERMOMETER.

Application filed December 29, 1923. Serial No. 683,397.

This invention is a thermometer especially adapted for use in conjunction with a bath and its purpose is to enable one preparing for the bath to properly regulate the temperature of the water in order that scalding due to too high a temperature or deleterious shocks to the system incident to stepping into water at too low a temperature may be avoided.

Through the use of the present invention, the temperature of the water of the bath may be accurately determined before the bath is entered. The present invention fills a long felt want especially in connection with the bath of children where a predetermined uniform temperature is essential to the health of the child. The invention is not however limited to use in conjunction with children's baths, but is equally applicable for use by adults, as evidenced by the fact that annually numbers of fatalities are recorded as a result of shocks received by stepping into a bath of too low a temperature as well as by scalding when the water is at too high a temperature.

The present invention embodies a thermometer adapted to be suspended in a convenient position above the bath tub, the registering tube being of U shape configuration. One end of the tube is open to the atmosphere to permit of proper venting thereof and the other end is connected by means of a relatively long and cylindrical flexible tube to a bulb, the tube and bulb being hermetically sealed and preferably containing air which under changes of temperature expands and contracts and effects movement of a reading liquid column contained within the U tube, one leg of which is associated with an appropriate reading scale.

In practice, the bulb hangs within the confines of the tub and the air therein is influenced by the water and its temperature raised to actuate the reading column. By reference to the scale, the temperature of the water may be properly regulated.

Aside from this broad statement of the invention, the invention further embodies numerous details of construction whereby accurate readings may be accomplished in a simple and expeditious manner. In other words, the device may be regulated in such manner during its initial assembly as to give accurate readings without incorporating into the device expensive structural parts. This enables me to market the device economically so as to place it within the reach of all.

Features of the invention, other than those specified, will be apparent from a reading of the hereinafter detailed description and claims when read in conjunction with the accompanying drawings.

The accompanying drawings illustrate the invention in different practical embodiments of the invention, but the constructions therein shown are to be understood as illustrative, only, and not as defining the limits of the invention.

Figure 1 is a perspective view illustrating the invention in use.

Figures 2 and 2ª are perspective views partly in section and showing certain parts of the construction dismantled in the interests of clearness.

Figure 3 is a section on the line 3—3 of Figure 1.

Figure 4 shows the U tube removed.

Figure 5 illustrates, in central section, a modified form of bulb; and

Figure 6 is an enlarged detail of a part of the construction illustrated in Figure 5.

Referring to the drawings, 1 designates a holder which may be made from wood, metal or any other suitable material and 2 designates a face plate on which is printed or otherwise delineated a reading scale 3. 4 denotes a glass U tube which straddles the plate 2 and is received within a notch or cut out 5 in the lower end of the plate as best shown in Figure 2.

The plate 2 is adapted to be secured to the holder 1 by means of screws, nails or other means passed through the perforations 6 and when the parts are thus assembled the leg 4ª of the U tube is positioned before the face plate 2 while the leg 4ᵇ of such tube is positioned rearwardly of the face plate and is received within a channel 7 formed longitudinally within the holder 1 as shown in Figures 2 and 3. Both legs of the U tube partake of a vertical position and the tube, which is hollow, contains a reading column 8 as best shown in Figure 4.

The upper end of the leg 4ª is drawn down to a small air vent sufficiently large to permit proper venting of this leg but sufficiently small to preclude the liquid of the reading column from running out through the tube. This constricted upper end which is shown at 9 is normally covered by means of a suitable loose fitting cap 10 and the U tube is maintained against dropping away from the face plate by inserting a small plug 11 in the bottom of the channel 7 after the parts have been assembled. This plug may be glued or otherwise fixed in place. The upper end of the other leg 4ᵇ of the U tube is connected by means of a suitable cap 12 to a pressure communicating tube 13 which is of sufficient length to reach downwardly into the interior of the tub 14 with which the device is associated. At the lower end of the tube 13 is affixed a bulb 15, two forms of which are shown in the drawings. In the form of the invention illustrated in Figure 2ᵃ, the lower end of the pressure tube 13 extends into and is firmly secured within a passage leading through a stopper 16. The stopper normally closes the upper end of a cylindrical body 17, the lower end of which is closed.

In the construction of Figures 5 and 6, the same kind of a stopper 16 is used, but the lower end of the body 17ᵃ is provided with a tapped hole in which is threaded an adjusting screw 18 provided with a longitudinal passage therethrough terminating in the valve seat 19. A valve 20 in the form of a set screw cooperates with the valve seat 19 and when screwed tightly to the seat seals the passage through the adjusting screw 18. When the valve is unscrewed however the passage is vented by means of a channel or flat side 21 on the valve. The purpose of the valve and adjusting screw is to regulate the amount of air normally contained within the bulb 15 as this amount of air and the pressure of such air will largely determine the accuracy of operation of the thermometer readings. Morever, this construction will enable initial adjustment of the thermometer without special attention being required in the placement of the U tube relative to the scale. In other words, the U tube, scale and holder may be assembled without special care being taken as to the position of the reading column 8 and after these parts have been assembled the proper regulation of the thermometer may be effected.

The regulation of the reading column to be used with the structure shown in Figures 5 and 6 is very simple, it being apparent that by adjusting the screw 18, it may be made to displace a greater or lesser amount of air as required to bring about a proper adjustment of the reading column with reference to the scale. If the bulb is now packed in ice or in water at a known temperature, the adjustment of the screw 18 may bring the reading column into accurate position. If the bulb is now placed in water of a known higher temperature, the temperature should accurately register but if it does not it is apparent that there is probably some unequality in the U tube and this can be compensated for by admitting more air into the bulb or permitting the exit of some of the air already contained in it. This can be accomplished by opening the valve and at the same time screwing the screw 18 in or out as the case may be. After the valve has been closed again, the screw 18 should again be adjusted.

These adjustments may be repeated two or three times before accuracy is obtained but inasmuch as they are simple a workman can after a short time become sufficiently skilled in such regulation as to obtain the desired adjustment the first time.

The construction shown in Figures 2 and 2ᵃ is adjusted in a somewhat different manner. The air displacement may be effected by dropping shot, sand or other material 22 into the bulb and then replacing the stopper It will be manifest, however, that the adjustments obtained from Figure 2 will not be as fine as in the construction of Figures 5 and 6 but are sufficient for practical purposes as an error of a degree or two in the temperature of bath water is not serious.

After the adjustments have been initially obtained as described, the bulb parts may be fixed in permanent position and in condition to preclude leakage by dipping the bulb in any suitable waterproof solution.

In practice, the tube 13 may be made of any suitable material such as rubber or the like, but I find that very excellent results are obtained by making this tube of celluloid as it is light, cheap, durable and flexible. The upper portion of the tube 13 is, when the parts are assembled, housed within the channel 7 and the plug 11 is cut away to permit said tube to pass downwardly therethrough to the bulb.

The device is thoroughly sanitary and may be cleansed without detrimental results. Moreover it is small, compact and is aesthetic in appearance.

The foregoing detailed description sets forth the invention in its preferred practical form, but the invention is to be understood as fully commensurate with the appended claims.

Having thus fully described the invention, what I claim as new and desire to secure by Letters Patent is:

1. A bath thermometer embodying a U tube, a reading column in the tube, a flexible pressure communicating tube connected at one of its ends to one leg of the U tube, a hollow bulb connected to the other end of the pressure communicating tube, and means for regulating the capacity of the bulb.

2. A bath thermometer embodying a scale member provided on its face with a reading scale, a U tube straddling said member with one leg of the tube in cooperative relation with the scale, a reading column in the tube, a flexible pressure communicating tube connected at one of its ends to one leg of the U tube, a hollow bulb connected to the other end of the pressure communicating tube, means for regulating the capacity of the bulb, and means for regulating the normal pressure of the contents of the bulb.

3. A bath thermometer embodying a scale member provided on its face with a reading scale, a U tube straddling said member with one leg of the tube in cooperative relation with the scale, a reading column in the tube, a flexible pressure communicating tube connected at one of its ends to one leg of the U tube, a hollow bulb connected to the other end of the pressure communincating tube, means for regulating the capacity of the bulb, means for regulating the normal pressure of the contents of the bulb, the free end of the unencumbered leg of the U tube being drawn down to a relatively small opening sufficient to prevent venting of said leg but adapted to preclude the spilling of the material of the reading column.

4. A bath thermometer embodying a reading scale, a U-tube, one leg of which is positioned in cooperative relation with the scale, a reading column in the tube, a flexible pressure communicating pipe connected at one of its ends to one leg of the U-tube, a hollow bulb connected to the other end of the pipe, and means for regulating the capacity of the bulb.

5. A bath thermometer embodying a reading scale, a U tube with one leg of the tub in cooperative relation with the scale, a reading column in the tube, a flexible pressure communicating tube connected at one of its ends to one leg of the U tube, a hollow bulb connected to the other end of the pressure communicating tube, means for regulating the capacity of the bulb, and means for regulating the normal pressure of the contents of the bulb.

In testimony whereof I have signed the foregoing specification.

JACK D. SARTAKOFF.